(12) United States Patent
Bonn

(10) Patent No.: US 8,464,861 B2
(45) Date of Patent: Jun. 18, 2013

(54) VIBRATORY CONVEYOR

(75) Inventor: Karl Johan Christer Bonn, North Vancouver (CA)

(73) Assignee: Per Brunes, New Westminster (CA)

( * ) Notice: Subject to any disclaimer, the term of this patent is extended or adjusted under 35 U.S.C. 154(b) by 97 days.

(21) Appl. No.: 12/995,397

(22) PCT Filed: Jun. 25, 2009

(86) PCT No.: PCT/CA2009/000899
§ 371 (c)(1), (2), (4) Date: Dec. 22, 2010

(87) PCT Pub. No.: WO2009/155710
PCT Pub. Date: Dec. 30, 2009

(65) Prior Publication Data
US 2011/0083944 A1    Apr. 14, 2011

Related U.S. Application Data

(60) Provisional application No. 61/075,397, filed on Jun. 25, 2008.

(51) Int. Cl.
*B65G 27/06* (2006.01)

(52) U.S. Cl.
USPC ............................ 198/758; 198/759; 198/770

(58) Field of Classification Search
USPC .............. 198/752.1, 753, 758, 759, 760, 761, 198/766, 770, 771
See application file for complete search history.

(56) References Cited

U.S. PATENT DOCUMENTS

| | | | |
|---|---|---|---|
| 2,821,292 A | 1/1958 | Spurlin | |
| 2,936,064 A | 5/1960 | Schuessler | |
| 3,362,524 A | 1/1968 | Holman | |
| 3,581,871 A * | 6/1971 | Forman | 198/751 |
| 3,625,346 A | 12/1971 | Holman | |
| 3,655,032 A | 4/1972 | Willis | |
| 3,865,231 A * | 2/1975 | Ouska | 198/766 |
| 3,932,442 A | 1/1976 | Salmon et al. | |
| 5,094,342 A | 3/1992 | Kraus et al. | |
| 5,746,322 A | 5/1998 | LaVeine et al. | |
| 5,938,001 A | 8/1999 | Turcheck, Jr. et al. | |
| 6,666,336 B2 | 12/2003 | Kreft | |
| RE38,756 E | 7/2005 | Kraus et al. | |

(Continued)

FOREIGN PATENT DOCUMENTS

| | | |
|---|---|---|
| CA | 1139253 | 1/1983 |
| CA | 2242971 | 9/1997 |

(Continued)

OTHER PUBLICATIONS

Supplementary European Search Report issued on May 16, 2012 for EP Appl. No. EP 09768680.2.

(Continued)

*Primary Examiner* — James R Bidwell
(74) *Attorney, Agent, or Firm* — Bruce M. Green; Oyen Wiggs Green & Mutala LLP

(57) ABSTRACT

A balanced vibrating conveyor apparatus is provided by using a torsion bar spring and rocker arm for conveyor trough and balancing weight. The design provides synchronized 180° out of phase vibrations of trough and balancing weight as well as balance at variations in stroke lengths. With a torsion bar spring at the rocker arm node point, dynamic forces are minimized in the conveyor frame, as well as the building support structure.

28 Claims, 16 Drawing Sheets

U.S. PATENT DOCUMENTS

| 7,011,217 B2 | 3/2006 | Hanisch et al. |
| 2007/0215560 A1 | 9/2007 | Whisler et al. |

FOREIGN PATENT DOCUMENTS

| CA | 2204682 | 9/1998 |
| EP | 0119410 B1 | 1/1989 |
| FR | 1146129 | 11/1957 |
| GB | 759021 | 10/1956 |
| GB | 1122478 | 8/1968 |
| JP | 2000142949 | 5/2000 |
| JP | 2006256863 | 9/2006 |
| RU | 2254173 | 6/2005 |

OTHER PUBLICATIONS

English Abstract for JP 2000142949.
International Search Report issued on Oct. 19, 2009 for PCT/CA2009/000899 (Publ. No. WO 2009/155710).
English Abstract for JP 2006256863.
English Abstract for RU 2254173.
English Abstract for EP 0119410.
International Preliminary Report on Patentability issued on Jan. 5, 2011 for PCT/CA2009/000899 (Publ. No. WO 2009/155710).

* cited by examiner

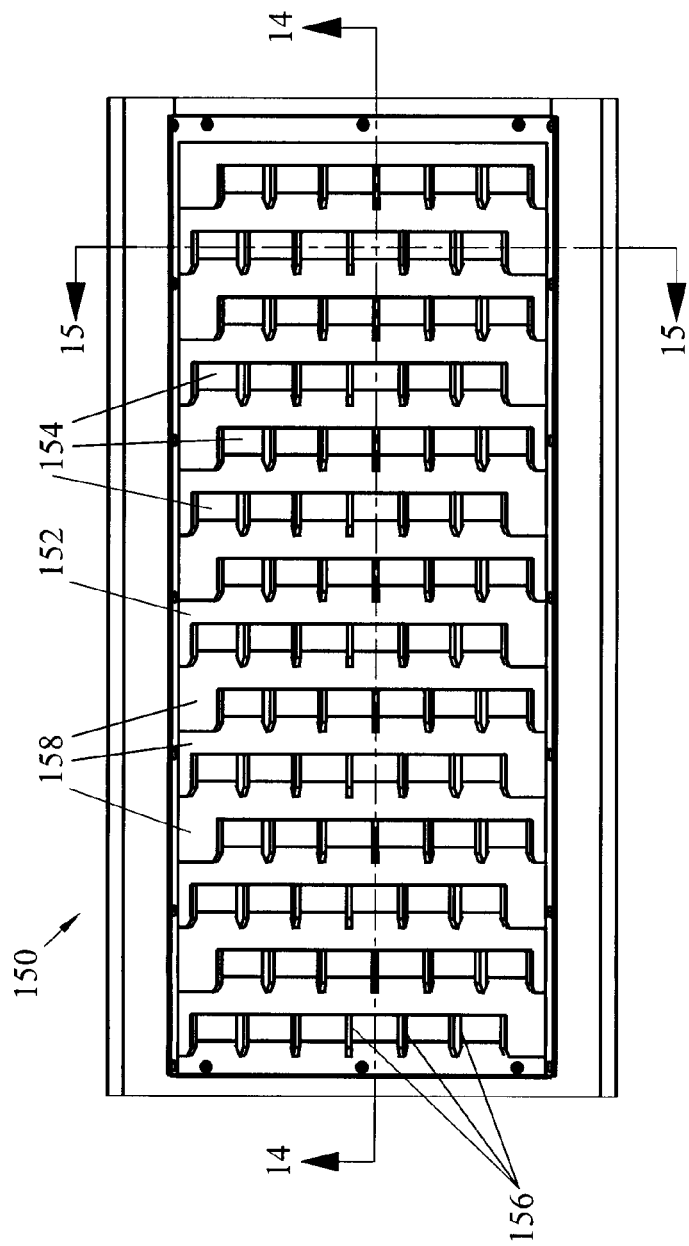
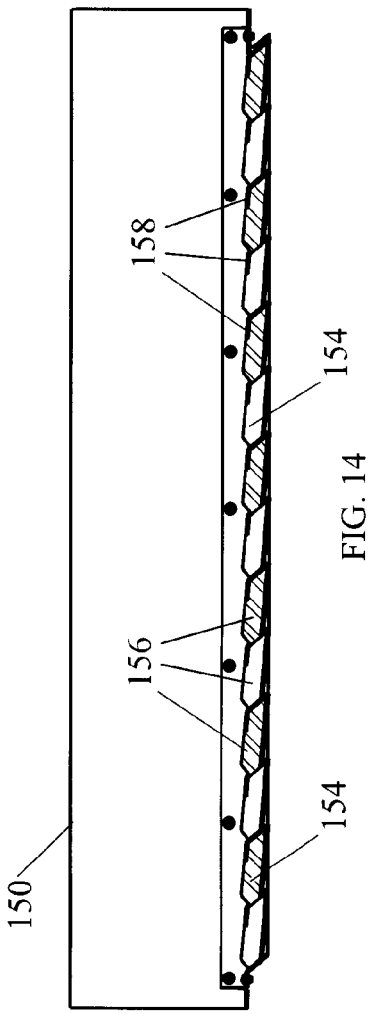
FIG. 13
FIG. 14

VIBRATORY CONVEYOR

REFERENCE TO RELATED APPLICATIONS

The present application claims the benefits, under 35 U.S.C. §119(e), of U.S. Provisional Application Ser. No. 61/075,397 filed Jun. 25, 2008 entitled "Vibratory Conveyor" which is incorporated herein by this reference.

TECHNICAL FIELD

The invention relates to the field of vibratory conveyors, feeders and vibrating screens.

BACKGROUND

Vibratory conveyors are widely used for material handling applications such as conveying, feeding or screening particulate materials. According to existing designs, a longitudinally-extending material-conveying deck, tray or trough is supported on leaf or coil springs mounted on a base which itself is fixed or may be spring-mounted. A motor-driven eccentric drive device or other source of vibration imparts vibratory movement to the deck or tray, which vibration is maintained by the leaf or coil springs connected to the base. The vibratory movement of the deck or tray conveys the particulate material on the deck surface.

A problem with the existing designs is that balancing vibrating conveyors which use coil springs is costly and unbalanced systems can cause heavy vibrations and noise in support structures which must be heavy and carefully designed.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention provides a simple economical design to achieve a balanced vibrating conveyor or similar apparatus by using a common spring and rocker arm for conveyor trough and balancing weight. The design provides synchronized 180° out of phase vibrations of trough and balancing weight at all frequencies as well as balance at variable stroke lengths. With a torsion bar spring at the rocker arm node points, dynamic forces are minimized in the conveyor frame, as well as the building support structure.

The present invention provides a vibratory conveyor comprising a frame, and a source of vibratory force for providing vibratory movement to a conveying surface, the conveying surface being pivotally attached to a counterweight element by a plurality of rocker arms, each rocker arm being mounted on the frame for pivoting motion about the central axis of one end of a torsion spring element to which it is fixed, the second end of the torsion spring element being fixed to the frame. Preferably the rocker arms are arranged in opposed pairs, with a first rocker arm in the pair being mounted on a first side of the frame for pivoting motion about the central axis of one end of a first torsion spring element to which it is fixed, the second end of the torsion spring element being fixed to the opposite side of the frame, and a second rocker arm in the pair being mounted on the opposite side of the frame for pivoting motion about the central axis of one end of a second torsion spring element to which it is fixed, the second end of the torsion spring element being fixed to the first side of the frame. Alternatively other combinations and arrangements of rocker arms and torsion spring elements can be used. Torsion bars or torsional bushings may be provided as the torsion spring element.

The present invention further provides a method of conveying material comprising i) providing a vibratory conveyor comprising a frame, and a source of vibratory force for providing vibratory movement to a conveying surface, the conveying surface being pivotally attached to a counterweight element by a plurality of rocker arms, each rocker arm being mounted on the frame for pivoting motion about the central axis of one end of a torsion spring element to which it is fixed, the second end of the torsion spring element being fixed to the frame; ii) applying vibratory movement to the conveying surface and thereby applying corresponding vibratory movement to the counterweight element until a steady state oscillation is reached; and iii) either before or after step ii) transferring the material to or placing the material on the conveying surface.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive

FIG. 13 is a plan view of a screen for use in the invention.

FIG. 14 is a cross-section view of the screen shown in FIG. 13 taken along lines 14-14.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
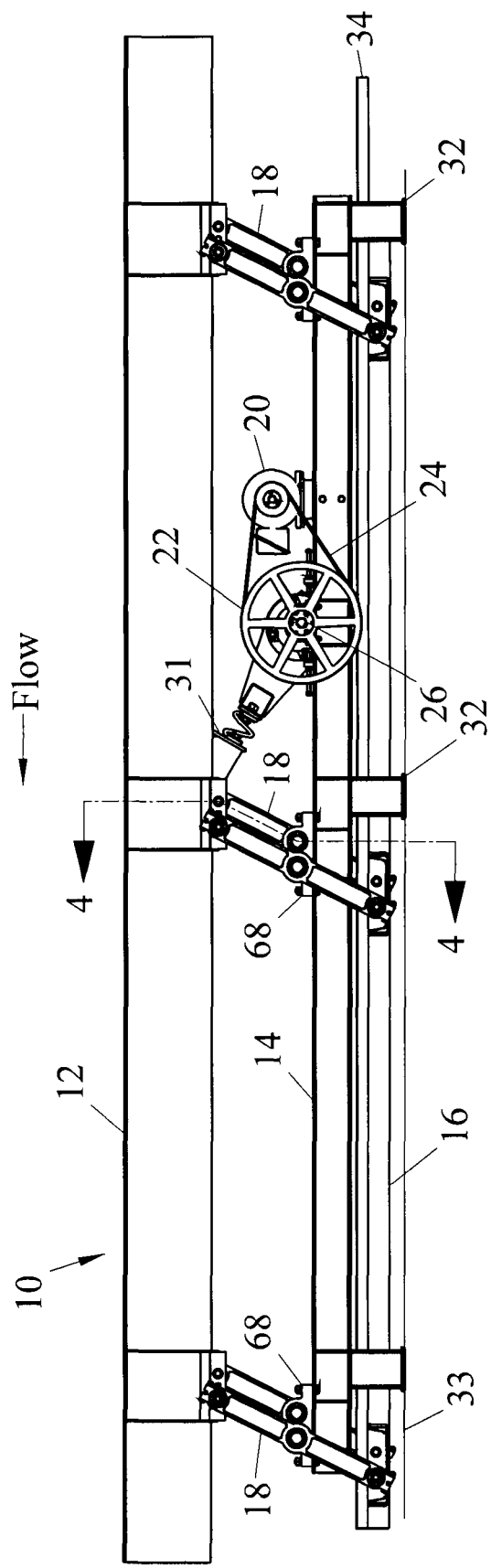
FIG. 1 is an elevation view of the vibratory conveyor according to the invention.
Figure 2:
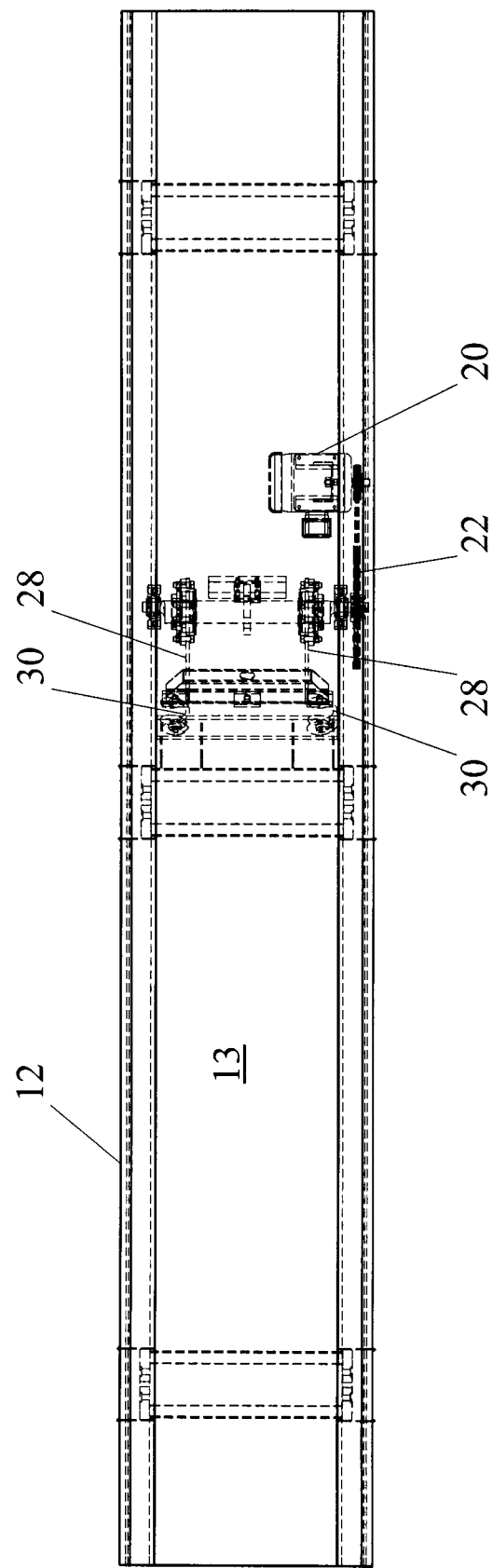
FIG. 2 is a plan view of the vibratory conveyor shown in FIG. 1.
Figure 3:
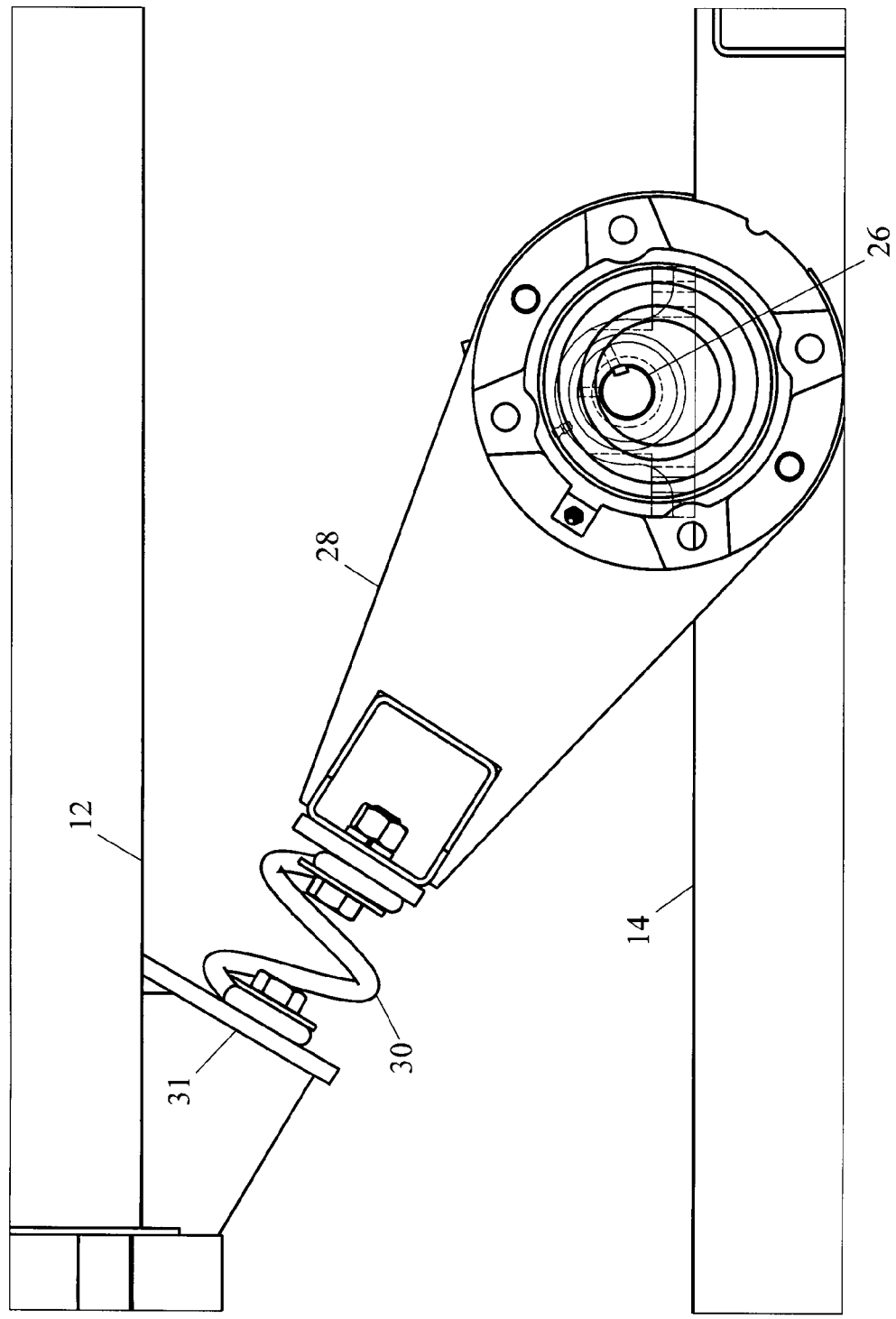
FIG. 3 is a detail of the vibratory drive shown in FIG. 1.

With reference to FIG. 1, a vibratory conveyor 10 having a flow direction as shown has a conveying trough 12, connected to base 14 and pivoting counterweight 16 by rocker arms 18 arranged in pairs on each side of trough 12. Motor 20 drives drive wheel 22 through drive belt 24. As shown in FIG. 3 in which drive wheel 22 is removed for illustration, drive wheel 22 has an eccentric axle 26 which transmits a vibratory motion to trough 12 through connecting arm 28 and coil spring 30 which is connected to trough 12 through flange 31. Other forms of a flexible connection could be used instead of coil spring 30, such as a rubber connector. Base 14 is raised off a supporting surface 33 by a number of legs 32. A lower trough 34 connected to counterweight 16 may also be used as an additional counterweight while forming a lower conveyor used to convey materials. Trough 12 has an inner surface 13 which may be perforated, as further described below in reference to FIG. 13-15, to screen particles which fall through to trough 34 to act as a lower conveyor to convey the screened material.

Figure 4:
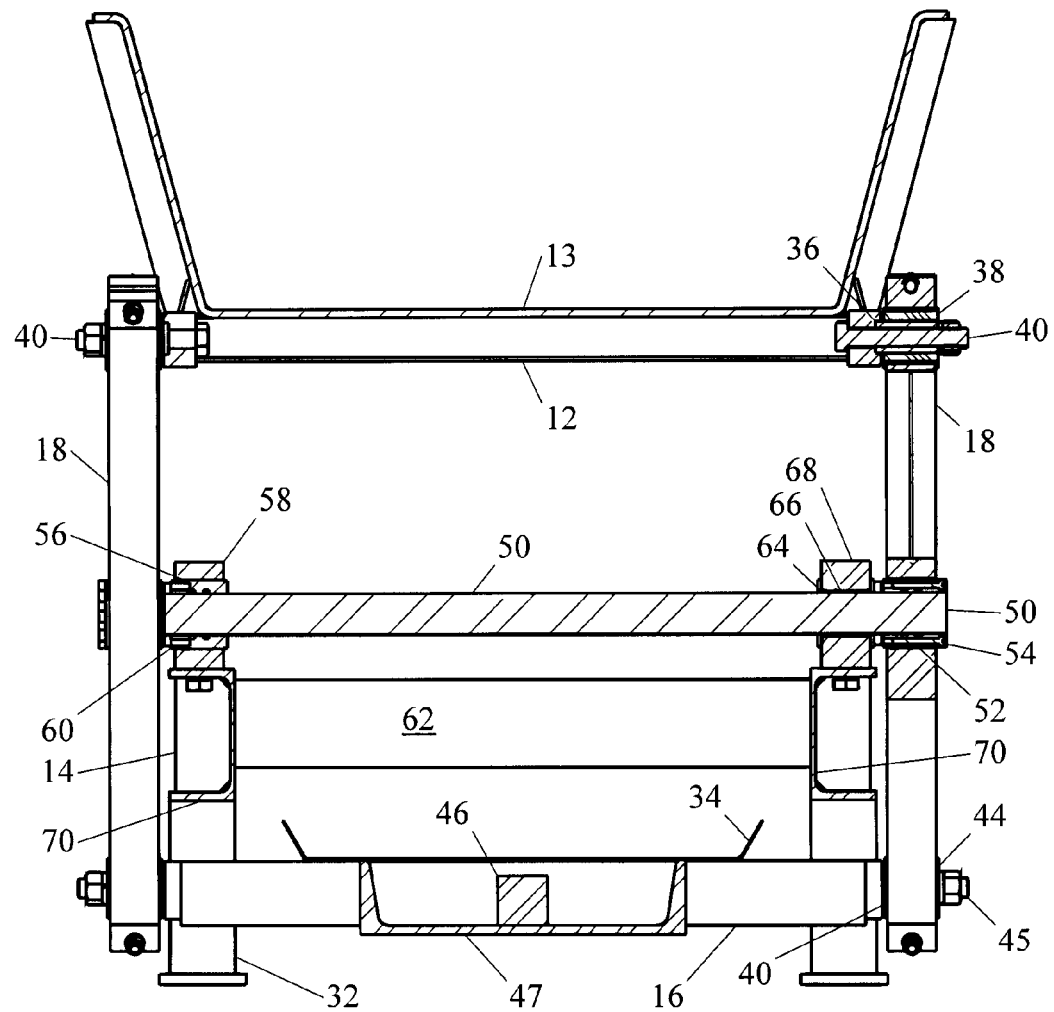
FIG. 4 is a cross-section taken along lines 4-4 of FIG. 1.
Figure 5:
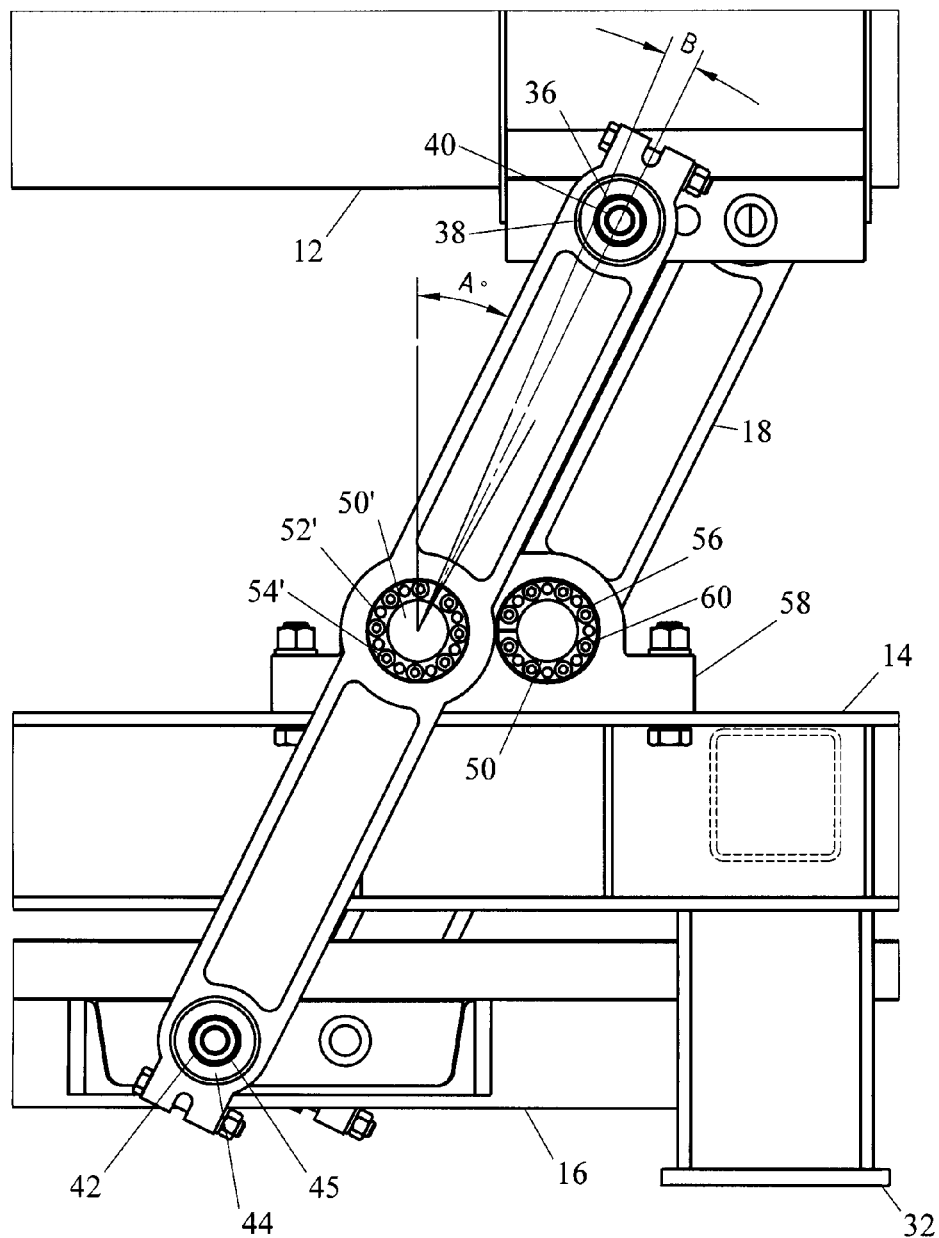
FIG. 5 is a detail elevation view of the rocker arm and torsion bar spring assembly shown in FIG. 1.
Figure 6:
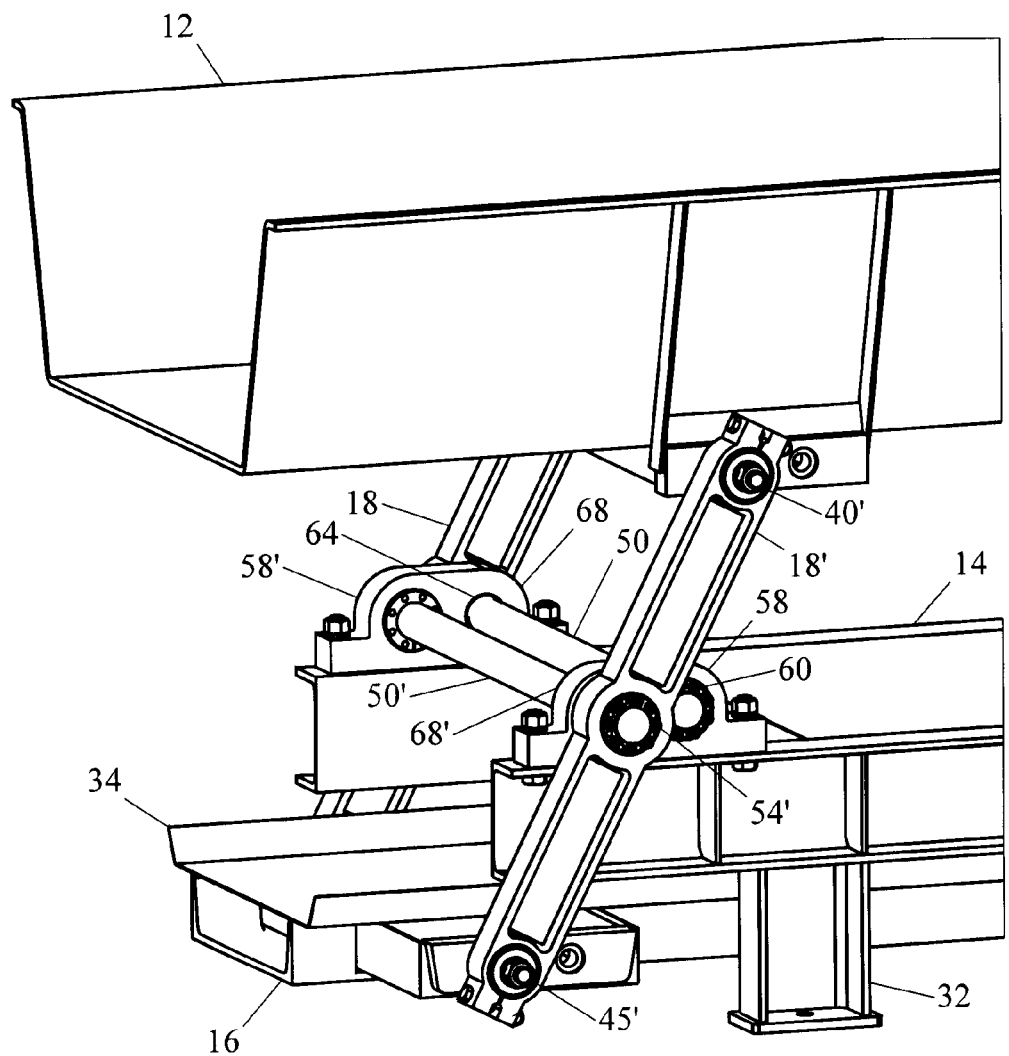
FIG. 6 is a detail perspective view of the rocker arm and torsion bar spring assembly shown in FIG. 5.

As shown in FIGS. 4, 5 and 6, each rocker arm 18 is pivotally connected at its upper end to trough 12 on axle 36 which is journaled in rocker arm 18 in bushing 38. Axle 36 is fixed to trough 12 by bolt 40. Rocker arm 18 is pivotally connected at its lower end on axle 42 which is journaled in rocker arm 18 in bushing 44. Axle 42 is fixed to counterweight 16 by bolt 45. Weights 46 may be placed in counterweight pan 47 to match or fine tune the weight of the counterweight 16 to that of the trough 12. The center of rocker arm 18 is provided with a circular opening 52 for receiving the end of torsion bar 50. The end of torsion bar 50 is secured fixedly in aperture 52 by a keyless shaft-hub friction connector 54 such as a B-LOC™ keyless shaft-hub friction connector. The other end of torsion bar 50 is secured fixedly in aperture 56 of flange 58 also by a keyless shaft/hub friction connector 60 or by other suitable means. Flange 58 is secured to base 14 by bolts, welding or the like. Horizontal torsion bar 50 pivots in bushing 64 mounted in aperture 66 of flange 68 which is secured to base 14 by bolts, welding or the like. Transverse members 62 join the parallel longitudinal members 70 of base 14. FIG. 6 illustrates a preferred configuration in which a pair of torsion bars 50, 50' is mounted in each set of flanges 58, 68, each connected to a rocker arm 18, slightly offset to permit installation.

Horizontal torsion bars 50 may be made of any suitable fatigue-resistant material and will vary depending on the application. A preferred form of torsion bars comprises spring steel cylindrical bars, and more preferably precision ground rounds such as C1045 or 4140HTSR, high carbon 5160H heat treated bars. Bars 50 should be free of any nicks or marks. Other suitable cylindrical bars of metal or other material may be used. In the embodiment shown in FIG. 1-6, horizontal torsion bars 50 are mounted half-way between the points of rotation of axles 36 and 42. By balancing the weight of the counterweight 16 to that of the loaded trough 12 this results in balancing of the vibratory forces transmitted through the base 14 to the supporting structure. The angle of attack A (FIG. 5) is the angle of the rocker arms 18 from vertical. It can be varied to vary the speed of conveying by rotating the rocker arms around their node or stationary pivot point (which in FIG. 5 is the central axis of torsion bars 50) thereby changing their inclination. Suitable angles of attack have been found to be 30 degrees plus or minus 15 degrees. The direction of transport can be changed by rotating the rocker arms to the other side of a vertical line through their node or stationary pivot point. Angle B in FIG. 5 is the total angle through which the end of torsion bar 50 which is fixed in rocker arm 18 twists. A typical setup will see a displacement or twist of the end of torsion bar 50 of a few degrees from the rest position, for a total twist in a cycle of twice that angle. The stroke of the conveyor, namely the horizontal displacement of the trough with each vibration at the steady state forced vibration frequency of torsion bars 50, is a function of the length of the rocker arm, the weight of the trough 12 and counterweight 16, the frequency of the vibration, the number and length and diameter of the torsion bars 50 and the modulus of elasticity of the torsion bars 50. In the configuration described, the rocker arms also provide a vertical component of vibratory movement which in combination with the horizontal component causes the particulate material to be conveyed when in operation.

For different size conveyors having differing widths, torsion bars 50 having different diameters will be advisable, since the spring force of the bars 50 is a function of the diameter and length of the bars. Torsion bars having a variable or progressive spring rate can also be provided by varying the diameter of the torsion bar along the length of the bar.

In operation, motor 20 is started and oscillatory motion is transmitted through flange 31 to trough 12. Such oscillatory motion causes rocker arms 18 to start to pivot about the central axes of torsion bars 50 at increasing angles of displacement until a steady state oscillation is reached at a smooth operational state, referred to herein as the "natural frequency" of torsion bars 50. The stationary pivot point about which the rocker arms pivot at their natural frequency is referred to as their "node". Particulate material placed on surface 13 of trough 12 is then conveyed due to the vertical component of vibration accompanying the horizontal component of vibration. If desired, the lower trough 34 can be used as a second vibratory conveyor to transport material from another source or screened from the conveyor trough 12 above.

The conveying speed may be varied by varying the frequency of vibration. This can be accomplished by varying the speed of motor 20. This can be done simply by use of a variable frequency drive to vary the frequency of the electric power provided to the motor 20. For example motor 20 may run at 1800 rpm with a 60 hertz frequency of the electric power provided. Using a variable frequency drive the speed of the motor can be increased or decreased by varying the electrical power above or below 60 hertz by varying the frequency drive. In turn this will vary the conveying speed. The frequency of the drive may alternatively be varied by the use of variable pitch belt sheaves or other variable-RPM arrangement.

Figure 7:
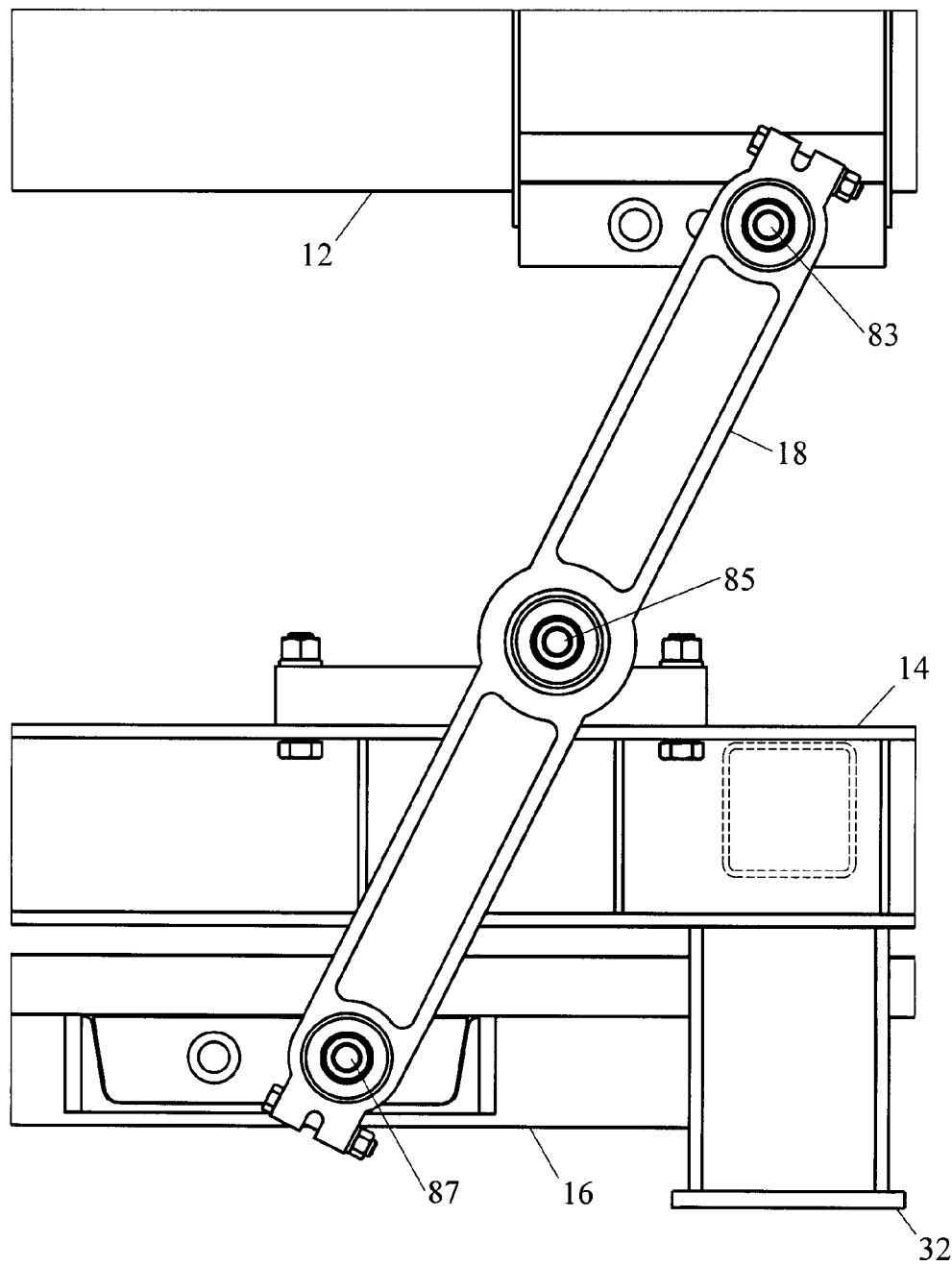
FIG. 7 is a detail elevation view of a second embodiment of the invention using rocker arm and torsion bushings.
Figure 8:
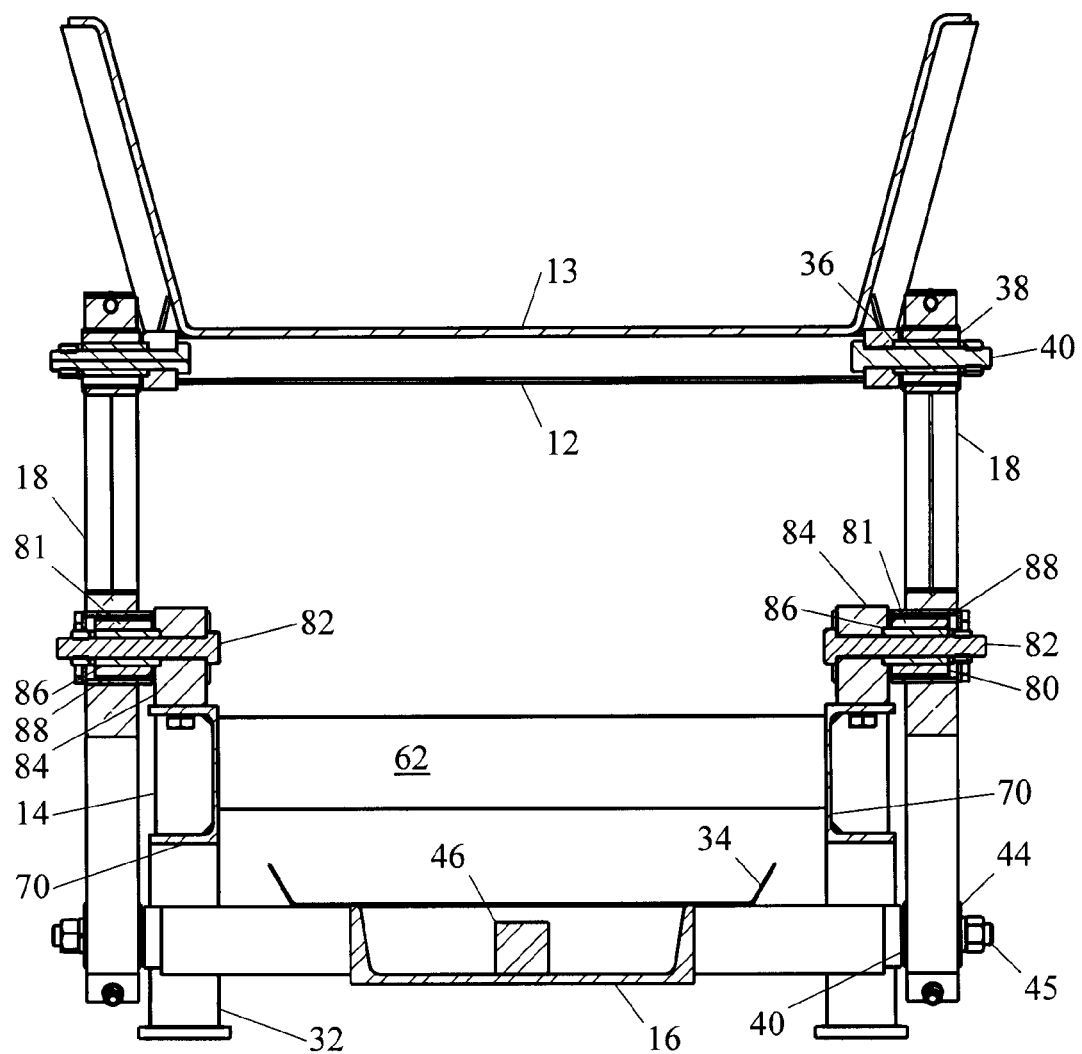
FIG. 8 is a cross-section view of the rocker arm and torsion bushing assembly shown in FIG. 7.

FIGS. 7 and 8 illustrate an alternate embodiment in which torsion bars 50 are replaced with torsion bushings 80. The torsion bushing 80 has an outer cylindrical metal surface 88 which is welded to the rocker arm 18 and an inner cylindrical bushing surface 86 which is secured to flange 84 by bolt 82. The material 81 between surfaces 88 and 86 has a suitable degree of flexibility that it functions in the same way as the torsion bars 50. A suitable material for example is TDI polyester based polyurethane. Suitable torsion bushings are manufactured by Redwood Plastics. Alternatively inner cylindrical bushing surface 86 of the torsion bushing 80 can be welded to the rocker arm 18 and the outer cylindrical metal surface 88 secured to flange 84. Similar torsion bushings can be provided at any one, or two or all of the pivot axes 83, 85, 87 of rocker arms 118.

Figure 9:
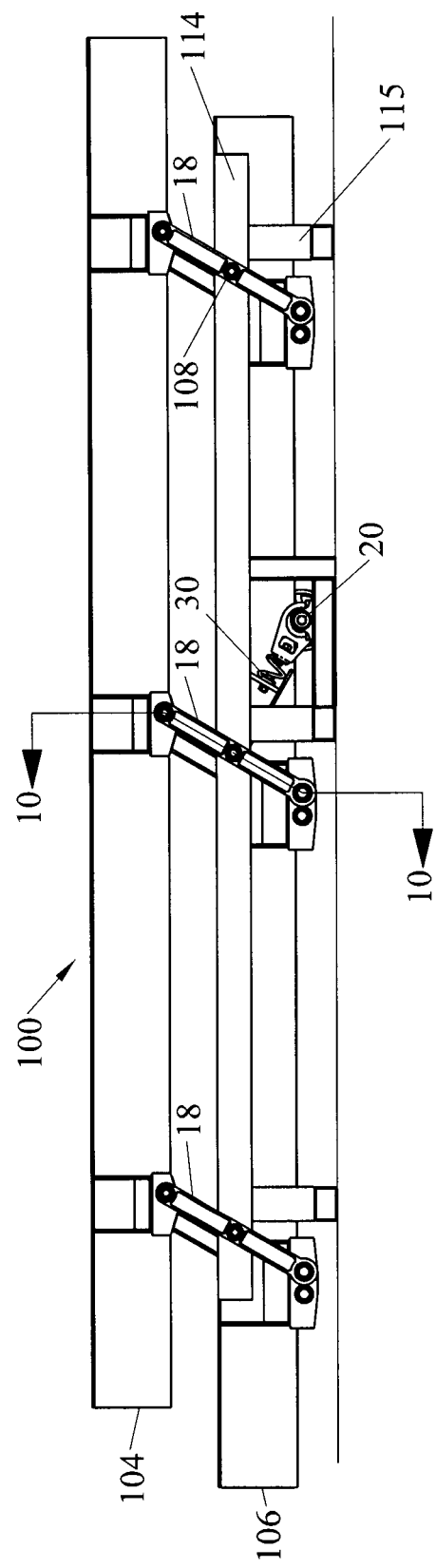
FIG. 9 is a detail elevation view of a third embodiment of the invention in which the torsion bar spring assembly is located below the lower trough.
Figure 10:
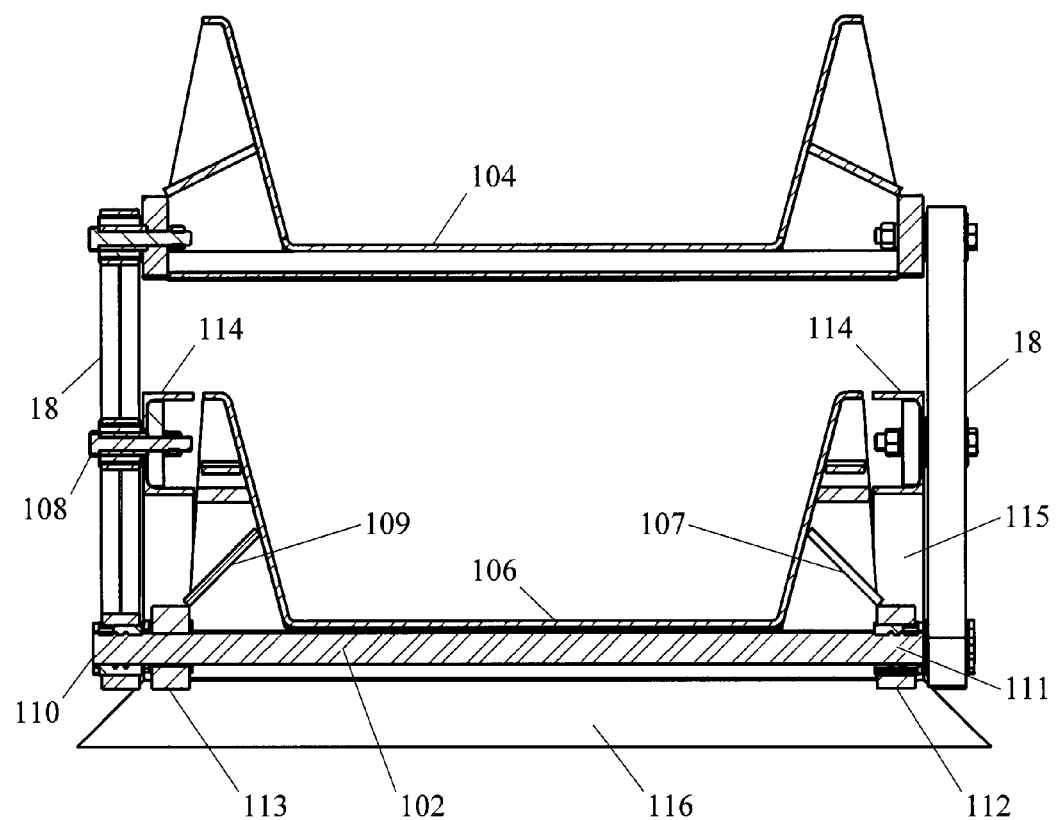
FIG. 10 is a cross-section view of the assembly shown in FIG. 9 taken along lines 10-10.

FIGS. 9 and 10 illustrate an alternate embodiment of the conveyor 100 having two conveying troughs 104, 106 wherein the torsion bar 102 is located beneath the lower trough 106 in order to clear the space above the lower trough 106. In this case the central axis 108 of rocker arms 18 pivots freely on central beam 114 which is fixed on legs 115 to base 116. The lower pivot point 110 of rocker arms 18 is fixed on one end of torsion bar 102 in the manner described above while the other end 111 of torsion bar 102 is fixed in flange 112, which in turn is connected to trough 106 by plate 107. Torsion bar 102 rotates in flange 113 which is secured to trough 106 by plate 109. Otherwise this embodiment functions as in the first embodiment. Motor 20 can be mounted centrally of the conveyor lengthwise with springs 30 straddling either side of trough 106. Motor 20 can also be mounted towards either end of the conveyor. Similarly the torsion bars 102 can be located above trough 104 or at any one, or two or all of the pivot axes of rocker arms 18.

Figure 11:
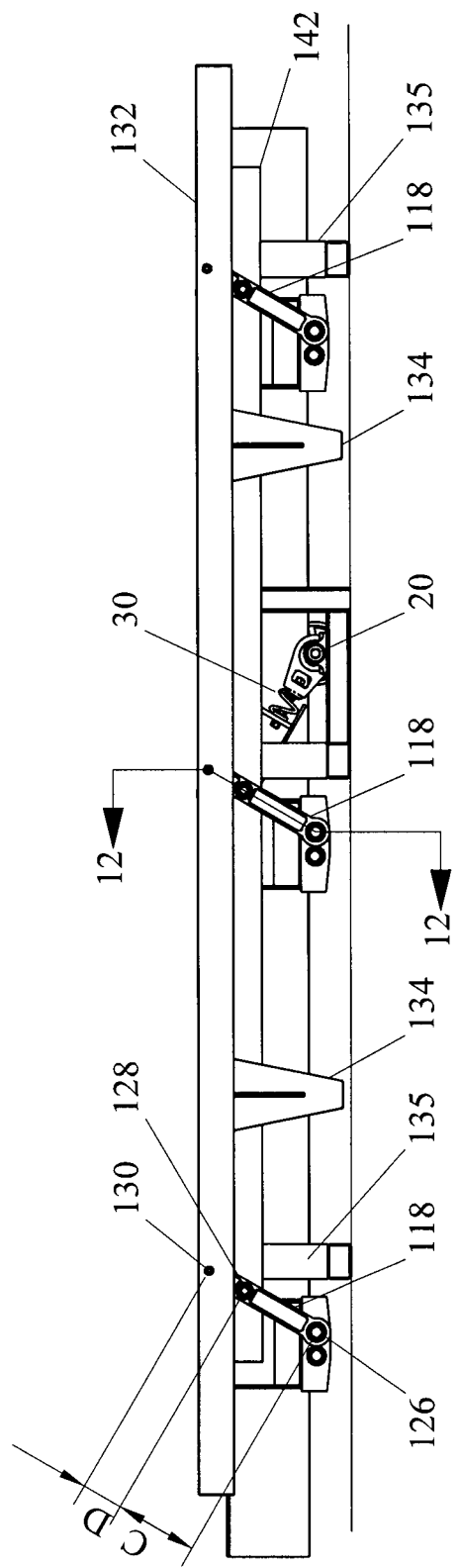
FIG. 11 is an elevation view of a fourth embodiment of the invention having uneven rocker bars to reduce the overall height.
Figure 12:
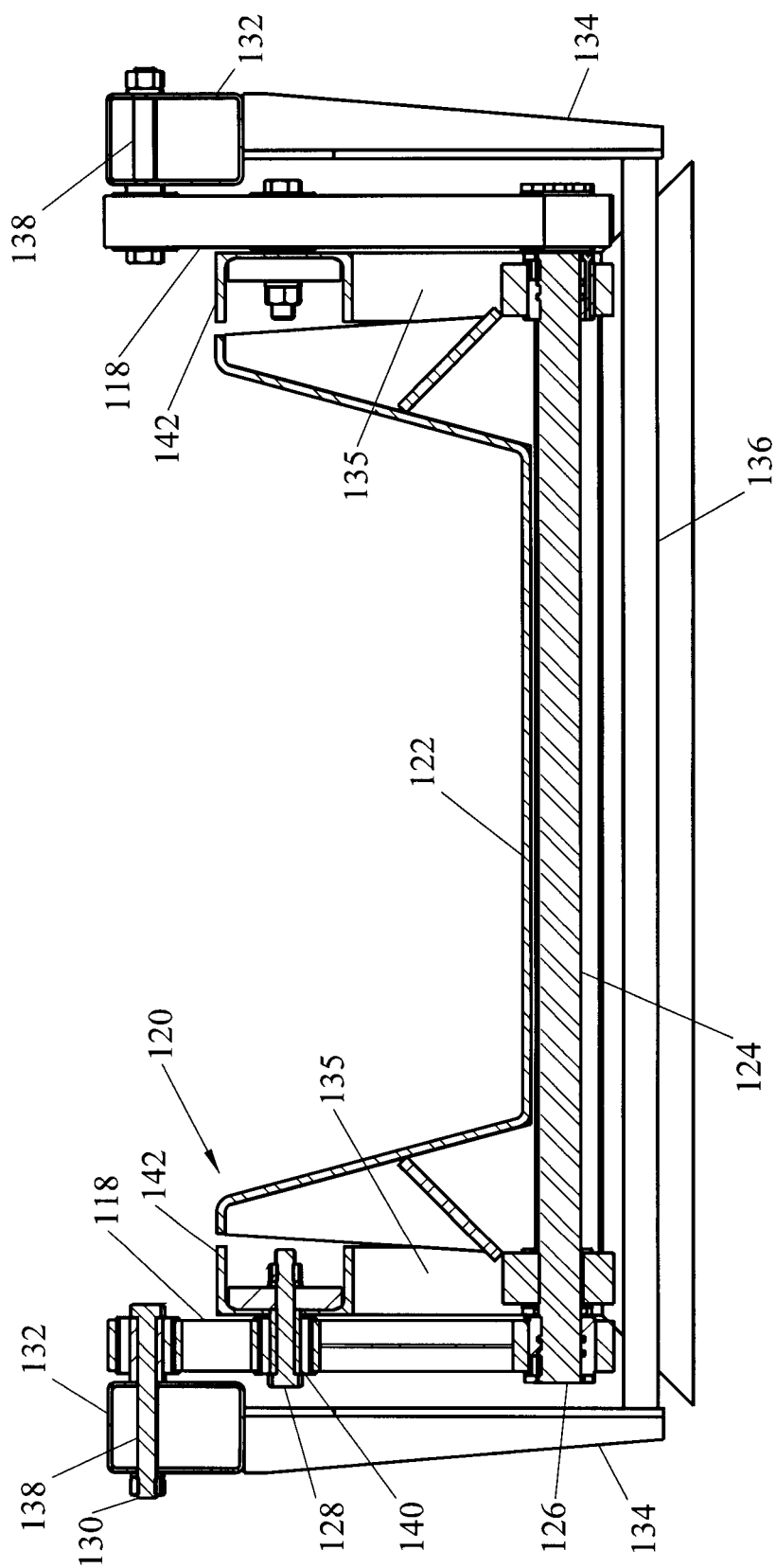
FIG. 12 is a cross-section view of the assembly shown in FIG. 11 taken along lines 12-12.

FIGS. 11 and 12 illustrate an alternate embodiment of the conveyor 120 having a low profile to reduce the overall height of the machine. A single conveying trough 122 is provided and the torsion bar 124 is located beneath the conveying trough. To achieve a lower height the rocker arms have uneven lengths about the central pivot point 128. That is, the length C of the arm from the lower axis 126 to the central axis 128 is greater than the length D of the arm from the upper axis 130 to the central axis 128. The upper end of rocker arms 118 are pivotally connected to parallel longitudinal balance beams 132 by bolts 138 as described above. Balance beams 132 provide the upper counterweight during the oscillatory motion. They may be stiffened to move in unison by providing connector bars 134 which are connected by beams 136 extending beneath the torsion bars 124. The center 128 of rocker arms 118 is connected to parallel central beams 142 by bolts 140 as described above. Beams 142 are secured to legs 135. Motor 20 can be mounted in the center of the conveyor lengthwise with springs 30 straddling either side of trough 122. Motor 20 can also be mounted towards either end of the conveyor.

Figure 15:
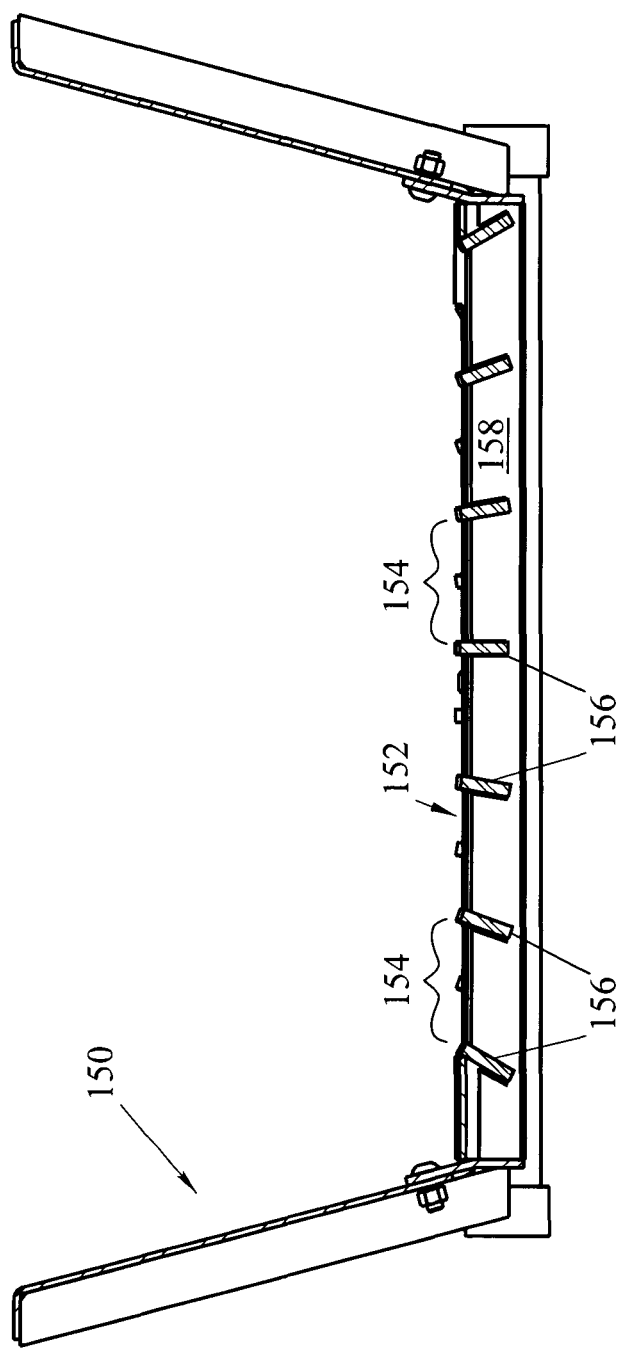
FIG. 15 is a cross-section view of the screen shown in FIG. 13 taken along lines 15-15.
Figure 16:
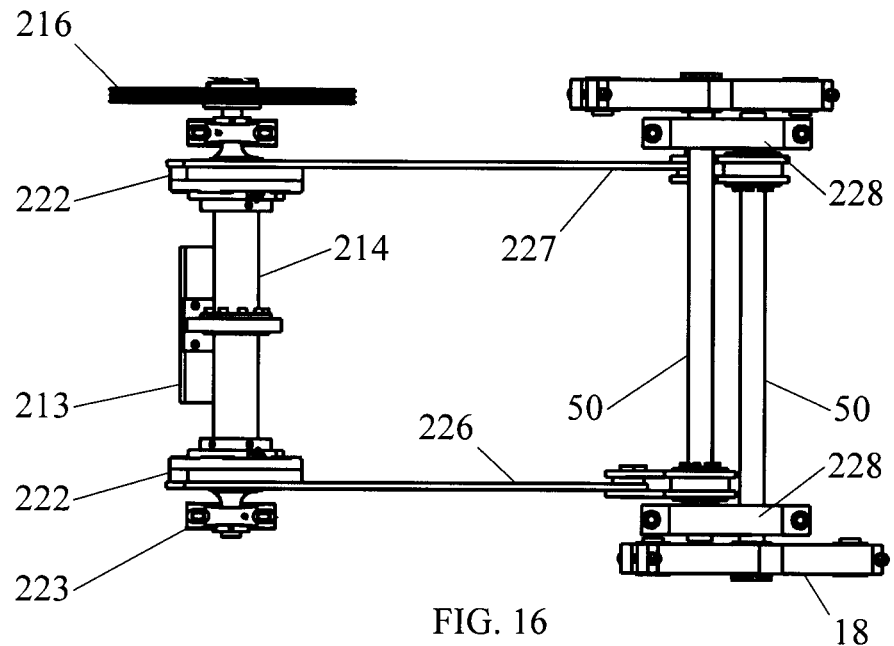
FIG. 16 is a plan view of a second embodiment of the vibratory drive.
Figure 17:
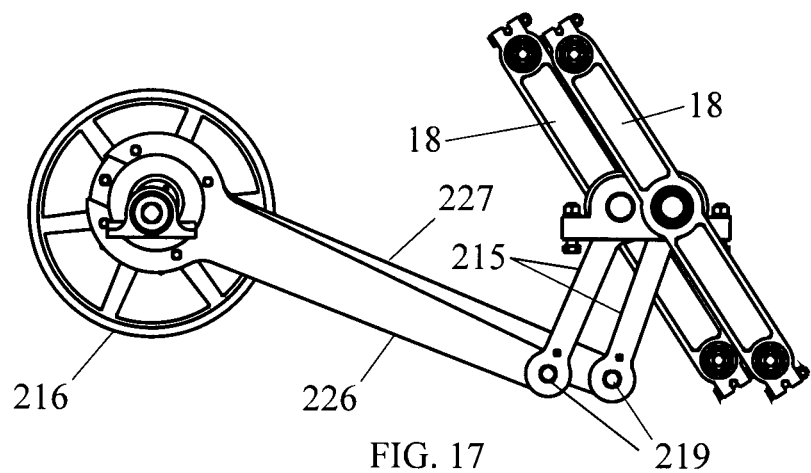
FIG. 17 is a side view of the vibratory drive shown in FIG. 16.
Figure 18:
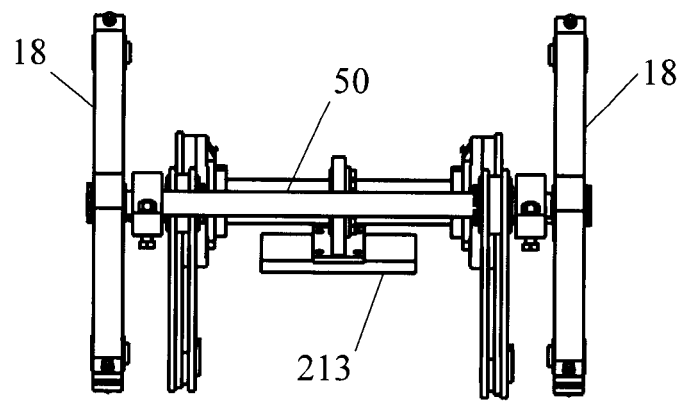
FIG. 18 is a rear view of the vibratory drive shown in FIG. 16.
Figure 19:
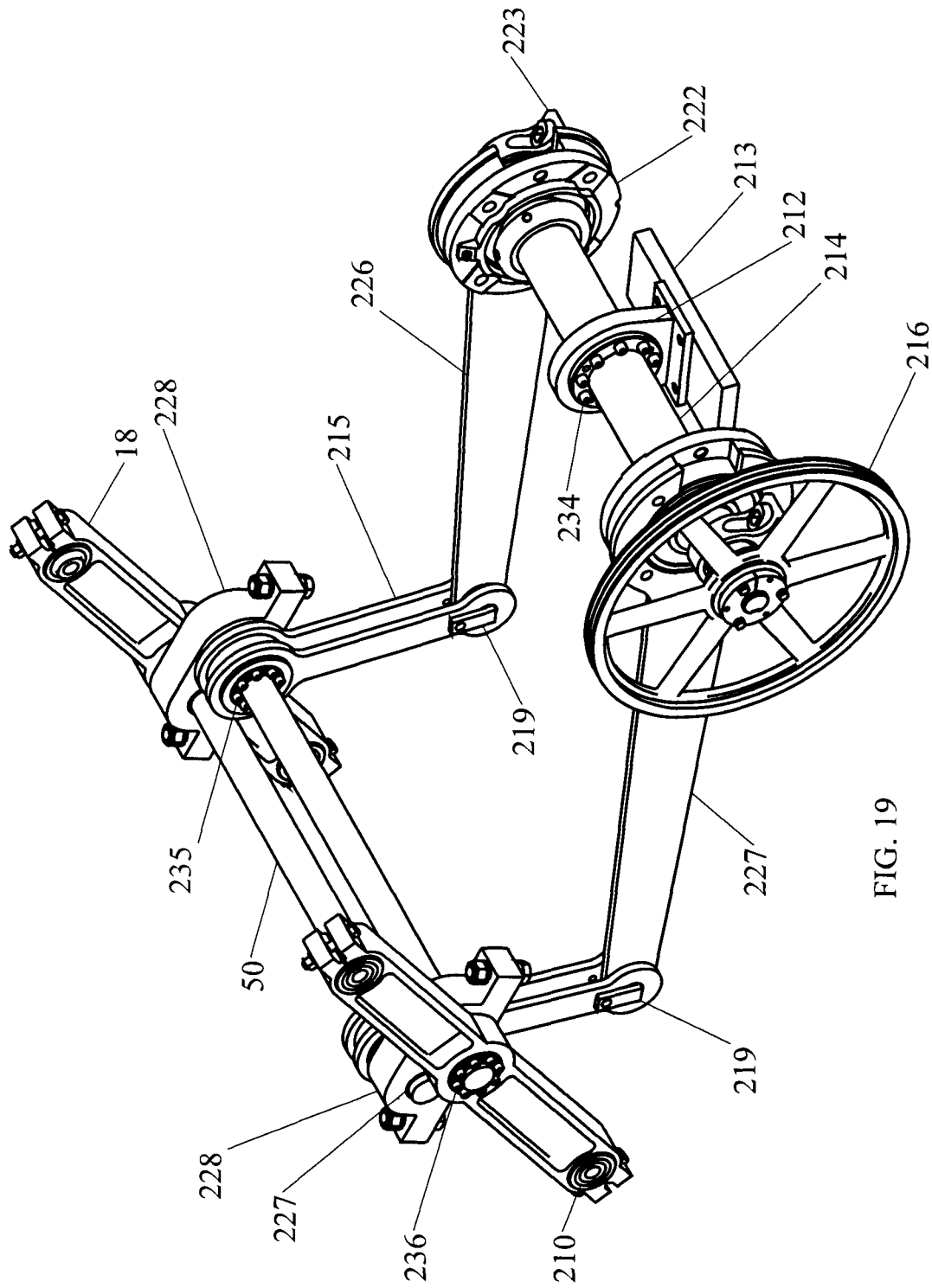
FIG. 19 is a perspective view of the vibratory drive shown in FIG. 16.

FIGS. 13 to 15 illustrate a design for the conveyor trough 150 with a slotted profiled screen horizontal support surface 152, in the case of a conveyor moving particles in the direction from right to left in FIG. 13. This is an alternative to the inner surface 13 described above in respect of FIG. 2 which may be perforated to screen particles. A series of parallel transverse slotted apertures 154 is formed by transverse plates 158. A series of diverting bars 156 are secured to plates 158, the lower leading edge of bars 156 being welded to the upper surface of plates 158 and the upper trailing edge of bars 156 being welded to the lower surface of plates 158. Bars 156 are angled from the vertical on either side of the longitudinal center line of the trough at progressively greater angles as the distance from the center increases in order to fan out the material to prevent plugging. The larger conveyed pieces continue over plates 158 from right to left while the smaller screened pieces drop down through apertures 154. The diverting bars 156 therefore tend to spread the screened materials away from the center of the conveyor as it passes through apertures 154.

FIGS. 16 through 19 illustrate a second embodiment of the vibratory drive which is springless. Motor 20 as in FIG. 1 drives sheave 216 through drive belt 24. Sheave 216 is mounted on an eccentric shaft 214 which rotates in bearing 223 and transmits a vibratory motion to rocker arms 18 through drive arms 226, 227 as described below. The ends of rocker arms 18 are pivotally connected to the conveyor troughs on bushings 210 as previously described. A balancing weight 213 is attached to shaft 214 by a hub 212 and lock assembly 234 in order to assist in balancing the drive system by countering the offset of eccentric shaft 214. Drive arms 226, 227 are journaled at one end on shaft 214 for rotation on bearings 222 and pivotally connected at the other end 219 to torsion arms 215. In the configuration shown one of the drive arms 226 is shorter than the other 227. Torsion arms 215 are locked at their upper end on torsion bars 50 by lock assembly 235 adjacent the flanges 228 in which the end of torsion bar 50 is free to rotate in bushing 227. The other end of torsion bar 50 is locked in the central axis of rocker arm 18 by lock assembly 236. In this way the drive provides a vibratory motion directly to torsion bars 50 which is communicated to the rocker arms 18 and thence to the conveyor.

The vibrating conveyor systems described above can be applied generally to vibratory feeders as well as to vibrating screens whereby the angle of attack of the rocker arms can be selected to reduce the amount of conveying movement.

The present invention therefore provides a vibratory conveyor comprising a frame, and a source of vibratory force mounted on a suitable location for providing vibratory movement to a conveying surface, the conveying surface being pivotally attached to a counterweight element by a plurality of rocker arms, each rocker arm being mounted on the frame for pivoting motion about the central axis of one end of a torsion spring element to which it is fixed, the second end of the torsion spring element being fixed to the frame. Preferably the rocker arms are arranged in opposed pairs, with a first rocker arm in the pair being mounted on a first side of the frame for pivoting motion about the central axis of one end of a first torsion spring element to which it is fixed, the second end of the torsion spring element being fixed to the opposite side of the frame, and a second rocker arm in the pair being mounted on the opposite side of the frame for pivoting motion about the central axis of one end of a second torsion spring element to which it is fixed, the second end of the torsion spring element being fixed to the first side of the frame. Alternatively other arrangements of torsion spring element configurations can be used.

The present invention further provides a method of conveying material comprising i) providing a vibratory conveyor comprising a frame, and a source of vibratory force mounted on the frame for providing vibratory movement to a conveying surface, the conveying surface being pivotally attached to a counterweight element by a plurality of rocker arms, each rocker arm being mounted on the frame for pivoting motion about the central axis of one end of a torsion spring element to which it is fixed, the second end of the torsion spring element being fixed to the frame; ii) applying vibratory movement to the conveying surface and thereby applying corresponding vibratory movement to the counterweight element until a steady state oscillation is reached at or near a natural frequency of the torsion elements; and iii) either before or after step ii) transferring the material to or placing the material on the conveying surface. Material can also be conveyed on the counterweight element where the counterweight element also provides a conveying surface.

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within their true spirit and scope.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A vibratory conveyor comprising:
    (a) a frame;
    (b) a first conveying member mounted on said frame and having a conveying surface;
    (c) a source of vibratory force for providing vibratory movement to said conveying member;
    wherein said first conveying member is pivotally connected to a counterweighting member by a plurality of connecting arms, each connecting arm being pivotally connected to said first conveying member at a first axis of rotation, to said counterweighting member at a second axis of rotation and being biased for oscillating motion about a third axis of rotation.

2. The vibrating conveyor of claim 1 wherein each said connecting arm is biased for oscillating motion about said third axis of rotation by being mounted on said frame for oscillating motion about the central axis of one end of a torsion spring element to which it is fixed, the second end of said torsion spring element being fixed to the frame.

3. The vibrating conveyor of claim 2 wherein said torsion spring element is a torsion bar.

4. The vibrating conveyor of claim 2 wherein said torsion spring element is a cylindrical torsion bushing, the outer surface of which is the first end of said torsion spring element and the inner surface of which is the second end of said torsion spring element.

5. The vibrating conveyor of claim 2 wherein said torsion spring element is a cylindrical torsion bushing, the inner surface of which is the first end of said torsion spring element and the outer surface of which is the second end of said torsion spring element.

6. The vibrating conveyor of claim 2 wherein said connecting arms are arranged in opposed pairs, with a first rocker arm in the pair being mounted on a first side of the frame for pivoting motion about the central axis of one end of a first torsion bar, the second end of the torsion bar being fixed to the opposite side of the frame, and a second rocker arm in the pair being mounted on the opposite side of the frame for oscillating motion about the central axis of one end of a second torsion bar, the second end of the torsion bar being fixed to the first side of the frame.

7. The vibrating conveyor of claim 1 wherein said counterweighting member comprises a second conveying surface for the transport of particulate material.

8. The vibrating conveyor of claim 2 wherein said central axis of one end of a torsion spring element is provided at any one or more of said first, second or third axes of rotation of said connecting arms.

9. The vibrating conveyor of claim 1 wherein an adjustable material transport speed is provided by varying the frequency of said source of vibratory force.

10. The vibrating conveyor of claim 9 wherein said frequency of said source of vibratory force is varied by the use of a variable frequency drive.

11. The vibrating conveyor of claim 9 wherein said frequency of said source of vibratory force is varied by the use of variable pitch belt sheaves.

12. The vibrating conveyor of claim 1 wherein the conveying speed and direction can be adjusted by adjusting the angle of attack of said connecting arms by rotating said arms about said third axis of rotation thereby changing their inclination to the vertical.

13. The vibrating conveyor of claim 12 wherein said angle of attack is set between 15 degrees and 45 degrees from either side of vertical.

14. The vibrating conveyor of claim 1 wherein said source of vibratory force comprises an eccentric shaft comprising eccentric cams offset by 180°.

15. A method of conveying material comprising: a) providing a vibratory conveyor comprising a frame, and a source of vibratory force for providing vibratory movement to a conveying member comprising a conveying surface, the conveying member being pivotally connected to a counterweighting member by a plurality of connecting arms, each connecting arm being pivotally connected at one end thereof to said first conveying member at a first axis of rotation, to said counterweighting member at a second axis of rotation and being biased for oscillating motion about a third axis of rotation; b) applying vibratory movement to the conveying surface and thereby applying corresponding vibratory movement to the counterweight member until a steady state oscillation about said third axis of rotation is reached; and iii) either before or after step ii) transferring the material to or placing the material on the conveying surface.

16. A vibrating conveyor, comprising:
    a) a frame;
    b) a first conveying member mounted on said frame and having a conveying surface, said first conveying member forming a first mass;
    c) a source of vibratory force for providing vibratory movement to said conveying member;
    d) a second mass, joined by a plurality of connecting arms to said first mass, whereby said two masses oscillate in opposite directions;
    wherein said masses oscillate about a stationary node point located on each said connecting arm thereby providing synchronized movement in opposite directions of the two oscillating masses, and wherein said connecting arms are connected to torsion bar spring elements at the node point of said connecting arms to produce a balanced vibrating system.

17. The vibrating conveyor of claim 16 wherein either one of said two masses may consist of a plurality of submasses which plurality of submasses vibrates as a single mass.

18. The vibrating conveyor of claim 16 wherein said source of vibratory force comprises an eccentric shaft with the eccentric cams offset by 180°.

19. The vibrating conveyor of claim 16 wherein the location of the node point on each said connecting arm is selected such that the forces generated by the two opposing oscillating masses cancel out each other to provide a balanced vibrating system.

20. The vibrating conveyor of claim 19 wherein said second mass comprises a conveying surface for the transport of material.

21. The vibrating conveyor of claim 19 wherein the magnitude of said two masses is selected so that in operation said masses oscillate at or near the natural frequency of the balanced vibrating system.

22. The vibrating conveyor of claim 16 wherein the conveying speed and direction can be adjusted by adjusting the angle of attack of said connecting arms by rotating said arms about their axis of rotation thereby changing their inclination to the vertical.

23. The vibrating conveyor of claim 22 wherein said angle of attack is set between 15 degrees and 45 degrees from either side of vertical.

24. The vibrating conveyor of claim 16 wherein an adjustable material transport speed is provided by varying the frequency of said source of vibratory force.

25. The vibrating conveyor of claim 24 wherein said frequency of said source of vibratory force is varied by the use of a variable frequency drive.

26. The vibrating conveyor of claim 24 wherein said frequency of the source of vibratory force is varied by the use of variable pitch belt sheaves.

27. The vibrating conveyor of claim 16 wherein said second mass oscillates 180° out of phase with said first mass.

28. A vibrating conveyor, comprising:
a) a frame;
b) a first conveying member mounted on said frame and having a conveying surface, said first conveying member forming a first mass;
c) a source of vibratory force for providing vibratory movement to said conveying member,
d) a second mass, joined by a plurality of connecting arms to said first mass, whereby said two masses oscillate in opposite directions;

wherein said masses oscillate about a stationary node point located on each said connecting arm thereby providing synchronized movement in opposite directions of the two oscillating masses; and wherein said second mass is joined by a plurality of connecting arms to said first mass at first and second axes of rotation, and said torsion bar spring elements are attached to said connecting arms at one or more of said first and second axes of rotation and said node points to produce a balanced vibrating system.

* * * * *